United States Patent

Pourreau

[11] Patent Number: 5,561,215
[45] Date of Patent: Oct. 1, 1996

[54] PYRROLIDONES FOR CLEANUP OF SULFUR-CONTAINING POLYMERS

[75] Inventor: Daniel B. Pourreau, Downingtown, Pa.

[73] Assignee: Arco Chemical Technology, L.P., Greenville, Del.

[21] Appl. No.: 299,133

[22] Filed: Aug. 31, 1994

[51] Int. Cl.$^6$ .............. C08G 75/00; B05D 3/04
[52] U.S. Cl. ............ 528/373; 528/374; 528/381; 528/387; 427/340; 427/341; 427/343; 427/352; 427/353; 252/364; 422/901
[58] Field of Search ................ 427/343, 352, 427/353, 340, 341; 528/52, 373, 374, 59, 381, 387; 252/364; 422/901

[56] References Cited

U.S. PATENT DOCUMENTS

| | | | |
|---|---|---|---|
| 2,466,963 | 6/1945 | Patrick et al. | 260/79.1 |
| 3,912,696 | 10/1975 | Doughty | 260/79 |
| 3,923,748 | 12/1975 | Hutt et al. | 260/77.5 |
| 4,117,196 | 9/1978 | Mathias | 528/271 |
| 4,366,307 | 12/1982 | Singh et al. | 528/373 |
| 4,425,467 | 1/1984 | Alvino et al. | 524/606 |
| 4,484,934 | 11/1984 | Ferrin et al. | 423/228 |
| 4,609,762 | 9/1986 | Morris et al. | 568/38 |
| 4,654,410 | 3/1987 | Kashiwame et al. | 525/534 |
| 4,783,522 | 11/1988 | Aritomi et al. | 528/226 |
| 4,896,250 | 1/1990 | Sullivan | 361/523 |
| 5,011,621 | 4/1991 | Sullivan | 252/162 |
| 5,049,169 | 9/1991 | Teramoto et al. | 55/158 |
| 5,232,515 | 8/1993 | Sullivan | 134/38 |

OTHER PUBLICATIONS

S. Ellerstein, "Polysulfides," Encyclopedia of Polymer Science and Technology. 2nd Ed. (1988), vol. 13, pp. 186–196.

*Primary Examiner*—John C. Bleutge
*Assistant Examiner*—Randy Gulakowski
*Attorney, Agent, or Firm*—Jonathan L. Schuchardt

[57] ABSTRACT

A method for removing cured sulfur-containing polymer sealants from surfaces is disclosed. The method comprises applying to the surface a sealant remover comprising at least about 50 wt. % of a pyrrolidone, especially N-methyl-2-pyrrolidone, and allowing the cured sulfur-containing polymer and the remover to remain in contact until the cured sulfur-containing polymer is loosened and can be easily removed from the surface. The method of the invention enables fast, effective removal of the sulfur-containing polymer sealants commonly used in the aerospace, construction, and insulating-glass industries.

5 Claims, No Drawings

PYRROLIDONES FOR CLEANUP OF SULFUR-CONTAINING POLYMERS

FIELD OF THE INVENTION

The invention relates to a method for removing cured sulfur-containing polymer sealants from surfaces. In particular, the invention is a method for removing these sealants using pyrrolidones.

BACKGROUND OF THE INVENTION

Sulfur-containing polymers, particularly polysulfides, are widely used in the aerospace, construction, and insulating-glass industries. They generally offer good solvent resistance, water-immersion resistance, shrink resistance, and good adhesion to glass, metal, and concrete.

Polysulfides are made by reacting bis(chloroethyl)formal, sodium polysulfide, and a small amount of trichloropropane to make a high molecular weight branched polysulfide. This product is then degraded with sodium hydrosulfide and sodium bisulfite to make a mercaptan-terminated polymer having a molecular weight within the range of about 1000 to 8000. The mercaptan-terminated polymer is then reacted with an oxidant such as lead dioxide or manganese dioxide to produce a cured polysulfide sealant.

Other types of sulfur-containing polymer sealants are made from mercaptan-terminated polyurethanes, and polythioethers. These polymers often cure by a polysulfide-type crosslinking mechanism. These other sulfur-containing polymer sealants are also used primarily in the aerospace, construction, and insulating-glass industries.

Cured sulfur-containing polymer sealants are difficult to remove from glass or metal surfaces with commercially available hand-wipe cleaners and common organic solvents. Even solvents that are reasonably good for coating removal, e.g., methylene chloride, are relatively ineffective on cured polysulfide sealants and pose toxicity, handling, and/or environmental concerns.

Still needed in the industry is a method for removing cured sulfur-containing polymer sealants from glass, aluminum, and other surfaces. Preferably, the method would quickly and completely soften and remove these sealants, and would use a low-toxicity, water-rinsable remover.

SUMMARY OF THE INVENTION

The invention is a method for removing cured sulfur-containing polymers from surfaces. The method comprises applying to the surface a sealant remover comprising at least about 50 wt. % of a pyrrolidone and allowing the cured sulfur-containing polymer and the remover to remain in contact until the cured sulfur-containing polymer is loosened and can be easily removed from the surface.

I surprisingly found that pyrrolidones are extremely effective for removing cured sulfur-containing polymer sealants from surfaces. The method of the invention gives fast, effective performance compared with common solvents such as methylene chloride, acetone, aromatic hydrocarbons, etc. N-methyl-2-pyrrolidone, a low-toxicity, water-soluble, biodegradable alternative solvent, is particularly useful in the invention.

DETAILED DESCRIPTION OF THE INVENTION

The method of the invention is useful for cleanup of sulfur-containing polymer sealants commonly used in the aerospace, construction, and insulating-glass industries. These sulfur-containing polymers include, for example, the well-known cured polysulfides derived from bis(chloroethyl)formal and sodium polysulfide. The preparation of polysulfides is described in S. Ellerstein, "Polysulfides," *Encyclopedia of Polymer Science and Engineering*, 2nd Ed. (1988), Vol. 13, pp. 186–196. Polysulfide preparation is also detailed in U.S. Pat. No. 2,466,963, the teachings of which are incorporated herein by reference.

Suitable polysulfide sealants include two-part and one-part formulations. Two-part sealants are usually made by combining polysulfide resin, fillers, plasticizers and other additives with an accelerator, typically a metal oxide. One-part sealants cure slowly with atmospheric moisture (see, e.g., U.S. Pat. No. 3,912,696).

The invention is well-suited for use, for example, with polysulfides available from Morton International, Inc. under the THIOKOL trademark, such as THIOKOL 800 and THIOKOL 810 insulating-glass sealants. Suitable polysulfides also include the "P/S" and "PR" series sealants available from Courtaulds Aerospace.

Sulfur-containing polymers useful in the method of the invention include those derived from mercaptan-terminated polyurethanes, and polythioethers, which often cure by a polysulfide-type crosslinking mechanism. These types of polymers are described, for example, in U.S. Pat. Nos. 4,609,762, 3,923,748, and 4,366,307, the teachings of which are incorporated herein by reference.

I surprisingly found that pyrrolidones are extremely effective for removing cured sulfur-containing polymer sealants from surfaces, much more effective than even such potent solvents as methylene chloride and dimethyl sulfoxide. Preferred pyrrolidones have the general structure:

in which R is selected from the group consisting of hydrogen and linear, branched, or cyclic $C_1$–$C_{10}$ alkyl. Suitable pyrrolidones include, for example, pyrrolidone, N-methyl-2-pyrrolidone, N-ethyl-2-pyrrolidone, N-n-butyl-2-pyrrolidone, N-tert-butyl-2-pyrrolidone, N-cyclohexyl-2-pyrrolidone, and the like, and mixtures thereof. N-methyl-2-pyrrolidone is particularly preferred.

Mixtures of pyrrolidones and one or more other organic solvents can also be used if desired, for example to improve performance, modify solubility, or reduce cost, provided that at least about 50 wt. % of the mixture is the pyrrolidone. If less than about 50 wt. % of the pyrrolidone is present, performance will typically be less than satisfactory, i.e., removal of the sealant will be incomplete and/or too slow. For best performance, it is generally preferred to use at least about 80 wt. % of the pyrrolidone in these mixtures.

Organic solvents useful in the mixtures include, but are not limited to, aliphatic and aromatic hydrocarbons, terpenes, halogenated hydrocarbons, esters (including lactones), ketones, carbonates, ethers, alcohols, amides, sulfoxides, glycol ethers, glycol ether esters, and the like, and mixtures thereof.

N-methyl-2-pyrrolidone is particularly effective in the method of the invention because it has exceptional ability to dissolve sulfur-containing polymer sealants. In addition, N-methyl-2-pyrrolidone is less toxic than common halogenated hydrocarbon solvents, is easy to recover, and is readily biodegradable. N-methyl-2-pyrrolidone is soluble in water, which makes water cleanup easy. Any available grade of N-methyl-2-pyrrolidone is generally effective in the method of the invention, including technical-grade material.

The sealant removers used in the method of the invention optionally include other additives that are well known in the industry. For example, surfactants and thickeners can be used to improve wetting and contact time with vertical surfaces. Other optional additives include accelerators, rust inhibitors, and the like. Examples of these additives appear in U.S. Pat. Nos. 5,232,515 and 5,011,621, the teachings of which are incorporated herein by reference.

The method of the invention comprises applying a pyrrolidone-containing sealant remover to a surface sealed with a sulfur-containing polymer. The sealant remover can be applied by any suitable method. For example, a piece can be dipped or soaked in a tank containing the sealant remover. If desired, the sealant remover can be sprayed, brushed, or rolled onto the surface.

Normally, exposing the sealed surface to the pyrrolidone-containing remover for about 1 or 2 hours will be effective to cause complete or nearly complete removal of the sulfur-containing polymer. Some pyrrolidones, including N-methyl-2-pyrrolidone, are hygroscopic and will become deactivated by prolonged exposure to humid air. For another coat if the sealant is not sufficiently softened by the initial treatment. The sealed surface can be metal (including aluminum and steel), glass, concrete, or any other surface that is not attacked by the sealant remover.

The following examples merely illustrate the invention. Those skilled in the art will recognize many variations that are within the spirit of the invention and scope of the claims.

EXAMPLE 1

Cleanup of a Cured Polysulfide: General Procedure

The effectiveness of N-methyl-2-pyrrolidone (NMP) and other common organic solvents for removing a cured polysulfide sealant from a metal surface is evaluated as follows.

Carbon steel coupons (1"×3") are coated with THIOKOL MC-236 B-½ polysulfide sealant (a fuel-tank sealant for aircraft, product of Morton International, Inc.), and are allowed to cure for at least 30 h at 25° C. Each coupon is immersed in an organic solvent (see Table 1) for 2 h, is dried in a vacuum oven (80° C., 10 mm Hg), and the wt. % of sealant removed is found by difference. Lift times are noted when the sealant is completely removed from the coupon. A cleanup grade from 0 (poorest) to 10 (best) is computed based on speed and effectiveness from the following formula:

$$\text{Cleanup Grade } (0\text{--}10) = \text{Wt. \% Sealant Removed}/10 \times (BLT/LT)^{(LT-BLT)/N}$$

in which BLT is the best lift time in a series of experiments, LT is the lift time obtained for a particular sample, and N is the immersion time. The exponential factor minimizes the importance of the lift time when the best lift time (BLT) approaches the immersion time (N). When BLT=LT, the speed factor drops out of the equation, and the cleanup grade only depends upon the wt. % of sealant removed.

For example, the cleanup grade for methylene chloride in Example 1 (Table 1) is found as follows:

$$\begin{aligned}
\text{Cleanup Grade } (0\text{--}10) &= \text{Wt. \% Sealant Removed}/10 \times \\
&\quad (BLT/LT)^{(LT-BLT)/N} \\
&= 24/10 \times (40/120)^{(120-40)/120} \\
&= 2.4 \times (0.3333)^{0.6667} \\
&= 2.4 \times 0.481 = 1.2
\end{aligned}$$

The results (Table 1) indicate that NMP is superior to the other common organic solvents tested for removing this common polysulfide sealant.

EXAMPLE 2

Polysulfide Cleanup with NMP-Aromatic Hydrocarbon Blends

The procedure of Example 1 is repeated with solvent blends of technical-grade N-methyl-2-pyrrolidone (NMP-T, a product of ARCO Chemical Company) and AROMATIC 150 solvent (product of Exxon Chemical). The results, which appear in Table 2, indicate that NMP blends with aromatic hydrocarbons are most effective when the blend includes at least about 80 wt. % of NMP, although performance is still acceptable at NMP levels as low as about 50 wt. %.

EXAMPLE 3

Cleanup of a Cured Polysulfide Sealant

Anodized aluminum coupons are coated with a ¹⁄₁₆" layer of Courtaulds Aerospace PS 870 B-2 polysulfide sealant, and are allowed to cure for 30 h at 25° C. Each coupon is immersed in an organic solvent (see Table 3) for 2 h, is dried under vacuum, and is reweighed as described in Example 1. A cleanup grade is calculated as previously described. The results (Table 3) demonstrate that NMP outperforms other common organic solvents for removing this aerospace polysulfide sealant.

EXAMPLE 4

Cleanup of a Cured Polythioether Sealant

The procedure of Example 3 is followed, except that the sealant used is Courtaulds Aerospace PR 1828 B2 polythioether sealant. The results (Table 4) show the superior performance of NMP for removing a polythioether sealant.

EXAMPLE 5

Cleanup of a Cured Polysulfide Sealant

The procedure of Example 3 is followed, except that the sealant used is Morton THIOKOL 800 insulating-glass sealant. The results (Table 5) show that NMP is also effective for removal of polysulfide sealants used in insulating-glass applications.

TABLE 1

Cured Polysulfide Cleanup:
THIOKOL MC-236 B-½ Sealant on Steel

| Solvent | Sealant Removed (wt. %) | Lift time (min) | Cleanup Grade |
|---|---|---|---|
| N-methyl-2-pyrrolidone (NMP) | 97 | 40 | 9.7 |
| DMSO | 99 | 70 | 8.6 |
| γ-Butyrolactone | 100 | 120 | 4.8 |
| Methylene chloride | 24 | 120 | 1.2 |
| 1,1,1-trichloroethane | 5 | 120 | 0.2 |
| Acetone | 4 | 120 | 0.2 |
| Dibasic esters | 3 | 120 | 0.1 |
| Propylene carbonate | 2 | 120 | 0.1 |
| DPMA | 0.8 | 120 | 0.0 |
| DPM | 0.1 | 120 | 0.0 |
| DPNB | 0 | 120 | 0.0 |
| AROMATIC 150 solvent | 0 | 120 | 0.0 |
| ISOPAR L solvent | 0 | 120 | 0.0 |

See Example 1 for procedure. DMSO = dimethylsulfoxide; DPMA = dipropylene glycol methyl ether acetate; DPM = dipropylene glycol methyl ether; DPNB = dipropylene glycol n-butyl ether. AROMATIC 150 solvent and ISOPAR L solvent are products of Exxon Chemical.

TABLE 2

Cured Polysulfide Cleanup:
THIOKOL MC-236 B-½ Sealant on Steel.
Effect of Blending NMP with Aromatic Hydrocarbons

| % NMP-T in Blend | Sealant Removed (wt. %) | Lift time (min) | Cleanup Grade |
|---|---|---|---|
| 100 | 99 | 40 | 9.9 |
| 80 | 100 | 50 | 9.8 |
| 60 | 100 | 80 | 7.9 |
| 40 | 84 | 120 | 4.0 |
| 20 | 5 | 120 | 0.2 |
| 0 | 0 | 120 | 0.0 |

See Examples 1 and 2 for procedure. NMP-T = technical-grade N-methyl-2-pyrrolidone, a product of ARCO Chemical Company; AROMATIC 150 solvent is a product of Exxon Chemical.

TABLE 3

Cured Polysulfide Cleanup:
Courtaulds Aerospace P/S 870 B-2
Sealant on Aluminum

| Solvent | Sealant Removed (wt. %) | Lift time (min) | Cleanup Grade |
|---|---|---|---|
| N-methyl-2-pyrrolidone (NMP) | 100 | 40 | 10 |
| DMSO | 100 | 110 | 4.2 |
| γ-Butyrolactone | 100 | 110 | 4.2 |
| Methylene chloride | 99 | 120 | 3.5 |
| Dibasic esters | 60 | 120 | 2.1 |
| Acetone | 13 | 120 | 0.5 |
| DPMA | 10 | 120 | 0.4 |
| DPTB | 8 | 120 | 0.3 |
| AROMATIC 150 solvent | 8 | 120 | 0.3 |
| Propylene carbonate | 8 | 120 | 0.3 |
| GLIDSOL 180 solvent | 4 | 120 | 0.1 |
| DPM | 4 | 120 | 0.1 |

TABLE 3-continued

Cured Polysulfide Cleanup:
Courtaulds Aerospace P/S 870 B-2
Sealant on Aluminum

| Solvent | Sealant Removed (wt. %) | Lift time (min) | Cleanup Grade |
|---|---|---|---|
| ISOPAR L solvent | 1 | 120 | 0.0 |

See Example 3 for procedure. DMSO = dimethylsulfoxide; DPMA = dipropylene glycol methyl ether acetate; DPTB = dipropylene glycol t-butyl ether; DPM = dipropylene glycol methyl ether. AROMATIC 150 solvent and ISOPAR L solvent are products of Exxon Chemical; GLIDSOL 180 solvent is a product of SCM-GLIDCO Organics Corp.

TABLE 4

Cured Polythioether Cleanup:
Courtaulds Aerospace PR 1828 B-2
Sealant on Aluminum

| Solvent | Sealant Removed (wt. %) | Time (h) | Cleanup Grade |
|---|---|---|---|
| N-methyl-2-pyrrolidone (NMP) | 99 | 8 | 9.9 |
| Methylene chloride | 42 | 8 | 4.2 |
| DMSO | 14 | 8 | 1.4 |
| γ-Butyrolactone | 13 | 8 | 1.3 |
| Acetone | 9 | 8 | 0.9 |
| AROMATIC 150 solvent | 9 | 8 | 0.9 |
| DPMA | 7 | 8 | 0.7 |
| Dibasic esters | 7 | 8 | 0.7 |
| Propylene carbonate | 5 | 8 | 0.5 |
| DPM | 4 | 8 | 0.4 |
| DPTB | 1 | 8 | 0.1 |
| GLIDSOL 180 solvent | 0 | 8 | 0.0 |
| ISOPAR L solvent | 0 | 8 | 0.0 |

See Example 4 for procedure. DMSO = dimethylsulfoxide; DPMA = dipropylene glycol methyl ether acetate; DPTB = dipropylene glycol t-butyl ether; DPM = dipropylene glycol methyl ether. AROMATIC 150 solvent and ISOPAR L solvent are products of Exxon Chemical. GLIDSOL 180 solvent is a product of SCM-GLIDCO Organics Corp.

TABLE 5

Cured Polysulfide Cleanup:
Morton THIOKOL 800 Insulating-Glass
Sealant on Aluminum

| Solvent | Sealant Removed (wt. %) | Time (h) | Cleanup Grade |
|---|---|---|---|
| N-methyl-2-pyrrolidone (NMP) | 100 | 20 | 10.0 |
| DMSO | 100 | 20 | 10.0 |
| γ-Butyrolactone | 35 | 20 | 3.5 |
| Acetone | 29 | 20 | 2.9 |
| Dibasic esters | 29 | 20 | 2.9 |
| Methylene chloride | 28 | 20 | 2.8 |
| AROMATIC 150 solvent | 26 | 20 | 2.6 |
| Propylene carbonate | 25 | 20 | 2.5 |
| DPMA | 23 | 20 | 2.3 |
| DPNB | 20 | 20 | 2.0 |
| DPM | 17 | 20 | 1.7 |
| GLIDSOL 180 solvent | 13 | 20 | 1.3 |

TABLE 5-continued

Cured Polysulfide Cleanup:
Morton THIOKOL 800 Insulating-Glass
Sealant on Aluminum

| Solvent | Sealant Removed (wt. %) | Time (h) | Cleanup Grade |
|---|---|---|---|
| ISOPAR L solvent | 13 | 20 | 1.3 |

See Example 5 for procedure. DMSO = dimethylsulfoxide; DPMA = dipropylene glycol methyl ether acetate; DPNB = dipropylene glycol n-butyl ether; DPM = dipropylene glycol methyl ether. AROMATIC 150 solvent and ISOPAR L solvent are products of Exxon Chemical; GLIDSOL 180 solvent is a product of SCM-GLIDCO Organics Corp.

The preceding examples are meant only as illustrations. The following claims define the scope of the invention.

I claim:

1. A method which comprises applying to a surface sealed with a cured sulfur-containing polymer selected from the group consisting of polysulfides, mercaptan-terminated polyurethanes, and polythioethers, a sealant remover comprising at least about 50 wt. % of N-methyl-2-pyrrolidone, and allowing the cured sulfur-containing polymer and the sealant remover to remain in contact until the cured sulfur-containing polymer is loosened and can be easily removed from the surface.

2. The method of claim 1 wherein the sealant remover comprises up to about 50 wt. % of one or more organic solvents selected from the group consisting of aliphatic and aromatic hydrocarbons, terpenes, halogenated hydrocarbons, esters, ketones, carbonates, ethers, alcohols, amides, sulfoxides, glycol ethers, and glycol ether esters.

3. The method of claim 1 wherein the sealant remover comprises at least about 80 wt. % of N-methyl-2-pyrrolidone.

4. The method of claim 1 wherein the loosened sulfur-containing polymer sealant is rinsed from the surface with water.

5. The method of claim 1 wherein the surface is selected from the group consisting of glass, metal, and concrete.

* * * * *